Oct. 2, 1951 F. H. FAY 2,569,926

TWO-WIRE DOUBLE COMMUTATION TELEGRAPH SYSTEM

Filed April 12, 1949

INVENTOR
F. H. FAY
BY [signature]
ATTORNEY

Patented Oct. 2, 1951 2,569,926

UNITED STATES PATENT OFFICE 2,569,926

TWO-WIRE DOUBLE COMMUTATION TELEGRAPH SYSTEM

Frank H. Fay, Huguenot Park, N. Y., assignor to American Telephone and Telegraph Company, a corporation of New York Application April 12, 1949, Serial No. 87,063

13 Claims. (Cl. 178—58)

Figure 1:
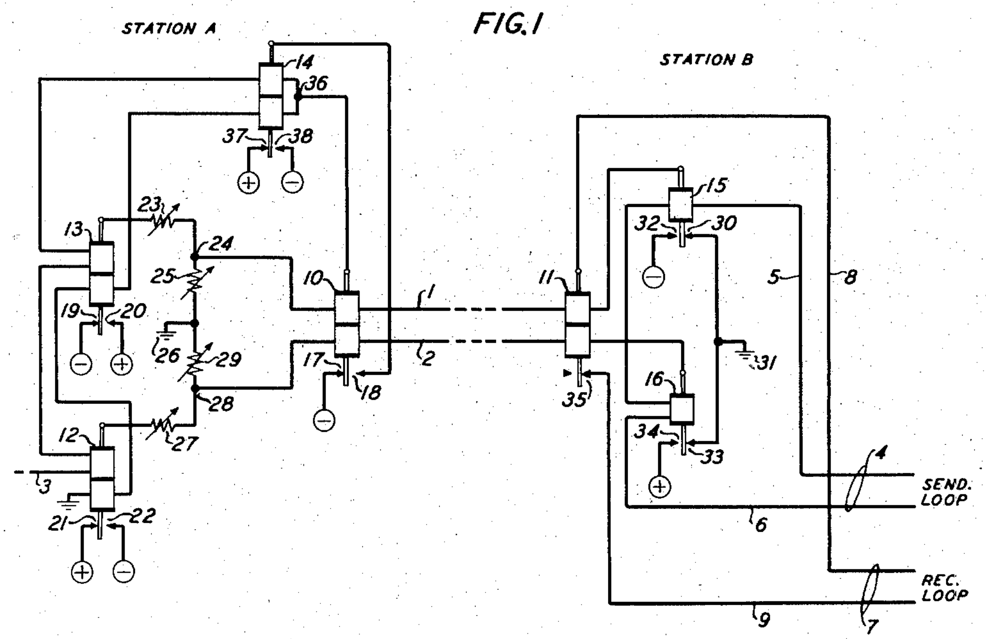

This invention relates to telegraph systems and more particularly to an improved two-wire direct-current polarential type telegraph system having a number of advantages over presently known systems, chief among which is a reduction in the adverse effects of induction in the operation of the system.

Induction or "cross-fire" as it is more generally termed in the art is frequently of very great importance. The signal currents received over long telegraph spans are generally of relatively small magnitude and frequently of the order of a few milliamperes. The difference between the currents required to operate the receiving device such as a sensitive polar relay for one signaling condition and leave the receiving device unoperated for another signaling condition may be only a few milliamperes. Under such conditions induced currents of small magnitude may make a system inoperative. For instance, when numbers of communication circuits are run through the same cable and thus spaced closely together induction tends to become an important factor. Near a repeater station for instance at the end of a long span incoming signals tend to be greatly attenuated while signals outgoing over conductors in the same cable are at full strength. A relatively small amount of induction between adjacent conductors may make a large proportionate and adverse change in the incoming signals causing false operation.

There are presently known in the art various ways of coping with the foregoing condition but induction is one of the limiting factors which is required to be taken into consideration in the spacing of communication conductors as well as in the length of spans between repeater stations.

It is an object of the present invention to minimize inductive effects in telegraph circuits.

As is well known, inductive effects may be produced in a particular circuit, say circuit A, by an adjoining circuit, say circuit B. Circuit A may also produce an inductive effect in circuit B. The circuit of the present invention is arranged to neutralize the inductive effect of other circuits in the present circuit and to minimize the inductive effect produced by the present circuit in other circuits. As a result of this it is possible to increase the length of spans between repeaters in cases wherein inductive effect on small signaling currents is a limiting factor.

There is another important aspect of the present invention. An important factor in the operation of telegraph circuits is the effect on their operation, particularly the operation of the receiving device, such as a polar relay, caused by variations in line resistance and in leakance. In the case of circuits in cable, such for instance as aerial cable employing small gauge conductors, temperature changes and consequent resistance changes in relatively short periods, such as between morning and noon, are frequently considerable, affecting circuit operation. In the case of open-wire circuits wide changes in the resistance between the conductor and ground, or leakance as it is known, are frequent, particularly in certain areas, due to changes in moisture conditions. When the weather is wet the resistance to ground is greatly lowered and its shunting effect on the receiving instrument is large.

The most effective manner of coping with changes in line resistance and in leakance resistance on direct-current telegraph circuits is described in Patent 2,131,870 issued to W. W. Cramer October 4, 1938, with particular reference to Figure 1 and Figure 2 thereof and their associated explanatory diagrams. The arrangement per Figure 1 of Patent 2,131,870, known in the art as a type A polarential circuit, is widely applied in telegraph systems on direct-current circuits which are subject to wide line resistance changes and the arrangement per Figure 2 of Patent 2,131,870, known in the art as a type B polarential circuit, is widely applied in telegraph systems on direct-current circuits which are subject to wide leakance resistance changes to minimize the adverse effect of these changes. Both the type A polarential circuit and the type B polarential circuit are subject to the effect of inductive interference. The present invention preserves the advantages of the type A and type B polarential circuits while greatly minimizing or eliminating the adverse effects of induction.

It is a further object of the present invention to provide circuits having the advantages of type A and type B polarential circuits while reducing the effect of induction therein and in adjoining circuits.

The present invention in one of its more important aspects is a two-wire polarential circuit, arranged for transmission in one direction at a time, in which inductive disturbances are balanced out in the two wires. There are two embodiments. In the first, exemplified in Figure 1 of the drawing herein, the circuit is arranged so that the transmission is similar to type A polarential, with the difference that the effect is achieved by means of two conductors acting cooperatively. In the second, exemplified in Fig.

2 of the drawing herein, the circuit is arranged so that the transmission is similar to type B polarential with the difference that the effect is achieved by two conductors acting cooperatively. The two conductors in Fig. 1 and in Fig. 2 are so arranged that currents induced from any neighboring circuit balance each other in their effect upon the receiving relay at each station in Fig. 1 and in Fig. 2. Further, the inductive effects tended to be produced in other circuits by the two conductors of the present circuits are balanced so that no inductive effect or at least a minimum inductive effect is produced in other circuits.

Although the invention is presently incorporated in two particular embodiments, it is to be understood that it is not so limited and may be incorporated in other embodiments which will be readily suggested to those skilled in the art by the present disclosure.

Figure 2:
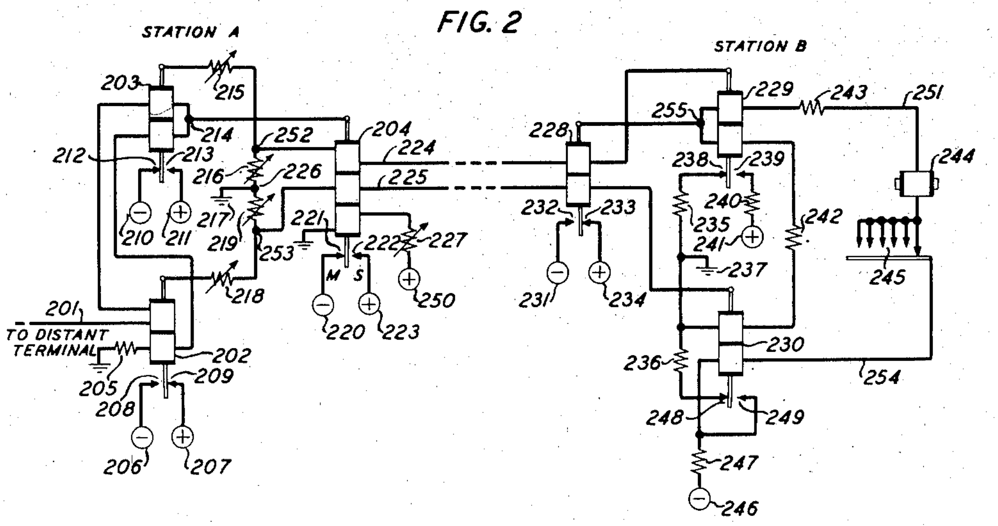

The invention may be understood from the following description when read with reference to the associated drawings in which:

Figure 1 shows a modified direct-current type A polarential telegraph system arranged for double commutation and employing two conductors between stations; and Fig. 2 shows a modified direct-current type B polarential telegraph system arranged for double commutation and employing two conductors between stations.

Refer now to Fig. 1. First, to generalize, in this figure two stations are shown, station A and station B, at the left and right of the figure, respectively. They are interconnected by two conductors 1 and 2 which, taken together, constitute a single telegraph channel as normally employed. Transmission over the channel is possible in only one direction at a time. At the left of Fig. 1 is shown a telegraph channel 3 extending to a distant station and at the right of the figure are shown a sending loop 4 comprising conductors 5 and 6 and a receiving loop 7 comprising conductors 8 and 9 which loops may extend, for instance, to a subscriber's premises. At station A is a receiving relay 10 and at station B is a receiving relay 11 each having a top and a bottom winding connected in aiding relationship in each relay to which windings conductors 1 and 2 are connected individually as shown. At station A are two sending relays 12 and 13 and an auxiliary relay 14. At station B are two sending relays 15 and 16 each having a single winding connected in series in the sending loop 4.

Signals incoming over channel 3 operate the armatures of sending relays 12 and 13 simultaneously to transmit signals over conductors 1 and 2 from station A to station B. These signals are impressed on receiving relay 11 at station B which propagates them into the receiving loop 7 to the subscriber's premises. Signals generated at the subscriber's premises are impressed on the sending loop 4 and actuate sending relays 15 and 16 simultaneously. These relays in turn transmit the signals over conductors 1 and 2 to station A where they actuate receiving relay 10 which in turn impresses the signals on channel 3.

When signals are transmitted from the distant station over channel 3 to station A, receiving relay 10 at station A follows them. Retransmission of these same signals back through channel 3 is prevented by auxiliary relay 14. The receiving relay 11 follows the signals transmitted from its sending loop 4 and sending relays 15 and 16. In following these signals the receiving relay 11 impresses them on the receiving loop 7 to provide a home copy of the message transmitted from station B.

Now to consider the arrangement per Fig. 1 in detail. For the marking condition channel 3 is terminated at the distant station in positive battery and the path extends from positive battery through channel 3 and the top winding of relays 12, 13 and 14 in series and through the armature and the marking contact 17 of relay 10 to negative battery. Current therefore flows in this path tending to actuate the armature of each of sending relays 12 and 13 and of auxiliary relay 14 to the left, as shown in Fig. 1, to engage with their respective marking contacts. This effect is dominant in each of these relays over the opposing effect of current flowing from negative battery through marking contact 17 of relay 10 and the bottom or biasing windings of relays 14, 13 and 12 to ground, which effect tends to actuate the armatures of relays 14, 13 and 12 to the right, and the armature of each of relays 14, 13 and 12 is actuated to the left to engage its respective marking contact as shown.

For this condition a circuit may be traced from negative battery through the left-hand or marking contact 19 of sending relay 13 and through adjustable resistance 23 to junction 24 where it divides into two parallel branches. One branch extends through adjustable resistance 25 to ground 26. The other branch extends through the top winding of relay 10, conductor 1, top winding of relay 11, armature and marking contact 30 of relay 15 to ground 31. A second circuit may be traced from positive battery through the armature and marking contact of relay 12 and adjustable resistance 27 to apex 28. From apex 28 one branch extends through adjustable resistance 29 to ground 26. A second branch extends through the bottom winding of relay 10, line conductor 2, bottom winding of receiving relay 11 and the armature and marking contact 33 of relay 16 to ground 31. The effect of this current in the top and bottom windings of relay 11 is additive and in a direction to actuate its armature to engage its marking contact 35. This closes the path through conductors 8 and 9 of receiving loop 7 and a marking condition prevails at the receiver on the subscriber's premises.

For the marking condition also, the effect of the current in the windings of receiving relay 10 at station A is additive and the armature of relay 10 engages its left-hand or marking contact 17 which impresses negative battery on the apex 36.

When a spacing signal is transmitted from the distant terminal over channel 3, the channel is opened. No current flows in the top windings of relays 12, 13 and 14 and the armatures of these relays are actuated to engage their respective right-hand contacts under the influence of their biasing windings. This reverses the polarity applied to each of conductors 1 and 2. The armature of relay 11 is actuated to engage with its left-hand or spacing contact opening the receiving loop and transmitting a spacing signal to the subscriber's premises.

It will be observed that the signals transmitted over each of conductors 1 and 2 from station A to station B are polar. That is, they are effected by reversals of the polarity of potentials of the same magnitude connected to each of lines 1 and 2 at station A. Each of conductors 1 and 2 is grounded at station B while signals are being transmitted from station A to station B.

Conductors 1 and 2 will ordinarily be of small gauge in aerial cable. The individual conductors will be affected by changes in temperature which may be as much as 100° F. from night to day and even greater in certain cases. This results in wide changes in resistance of the conductors, but since the individual conductors when in aerial cable are enclosed in an impermeable sheath, they are relatively unaffected by variations in moisture conditions and therefore leakance is relatively small and stable. The strength of the polar signals over each wire will be affected equally by variations in resistance in each of conductors 1 and 2. The sum of the currents in the top and bottom windings of relay 11 for the marking condition will be the same as the sum of the currents in these windings for the spacing condition at any given time. The effect of the current in each winding is additive for each of the marking and spacing conditions and the sums of the effects are in opposition for the marking and spacing condition. The armature of relay 11 will therefore respond with equal speed on marking and spacing signals at any given time. In short, the signals transmitted over the two-wire system from station A to station B are true polar signals.

In the case of relay 10, the reversal of the polarity connected at station A to conductors 1 and 2, when a spacing signal is transmitted from the distant terminal over conductor 3 through station A to station B, actuates the armature of relay 10 to engage contact 18. Simultaneously the armature of relay 14 is actuated, by the effect of current in its biasing winding, to engage its spacing contact 38 when conductor 3 is opened. This establishes a circuit from negative battery through spacing contact 38, armature of relay 14, spacing contact 18 and armature of relay 10 to apex 36. The negative batteries connected to contacts 17 and 38 are of the same magnitude. Since negative battery is connected through contact 17 and armature of relay 10 to apex 36 for the marking condition, the connection of negative battery of the same magnitude through spacing contact 38 to the apex 36 for the spacing condition also, prevents the breaking up of transmission from the distant station connected to channel 3, even though receiving relay 10 at station A responds to signals transmitted from channel 3 through station A.

The magnitude of the potentials of the batteries connected to the armatures of relays 12 and 13 are all equal. Adjustable resistances 23 and 25, 27 and 29, are adjusted so that the magnitude of the potential at apex 24 for the marking condition is one half the magnitude of the potential of negative marking battery 19 and the magnitude of the potential at apex 28 for the marking condition is one half the magnitude of positive marking battery 21. The potential drop from apex 24 at station A through conductor 1 to ground 31 at station B for the marking condition will be one half of the magnitude of the potential of negative battery 19. The potential drop from apex 28 at station A through conductor 2 to ground 31 at station B for the marking condition will be one half of the magnitude of positive marking battery 21. Similarly for the spacing condition the potential drop from apex 24 at station A through conductor 1 to ground 31 at station B will be one half the magnitude of the positive spacing battery 20. And the drop from apex 28 at station B through conductor 2 to ground 31 at station B, for the spacing condition will be one half of the magnitude of the potential of negative spacing battery 22.

The polarity and the magnitude of the potential impressed on the spacing contact 32 at station B is the same as that impressed on marking contact 19 at station A. The polarity and the magnitude of the potential impressed on spacing contact 34 at station B is the same as that impressed on marking contact 21 at station A. Since the magnitude of the potential at apex 24 is one half of that of the potential of marking contact 19, the drop of potential for a spacing signal transmitted from station B to station A from spacing contact 32 to apex 24 will be one half of the magnitude of the potential at spacing contact 32. Similarly the drop in potential for a spacing signal transmitted from station B to station A over lead 2 from spacing contact 34 to apex 28 will be one half of the magnitude of the potential at spacing contact 34.

In transmitting from station B to station A, considering conductor 1 and assuming a direction of flow of current from the more positive to the more negative point, for a marking signal, the direction is from ground at station B to potential $$-\frac{E}{2}$$

at apex 24 where —E is the potential of the source connected to marking contact 19. For a spacing signal from station B to station A over conductor 1 the flow of current is from apex 24, at which point the potential is $$-\frac{E}{2}$$

to the spacing contact 32, at which point the potential is —E. The direction of flow for a marking and spacing signal is reversed and the change in the magnitude of the potential is the same for each condition. In the case of conductor 2 the direction of flow is also reversed for the marking and spacing condition in transmitting from station B to station A while the magnitude of the potential change is the same for each signal.

The windings of relay 10 are connected, as explained, so that the effects of the marking signal currents in the two windings of relay 10 are additive for the marking condition and actuate the armature of relay 10 towards its left-hand or marking contact 17, connecting negative battery to apex 36, and are of course therefore additive for the spacing condition and actuate the armature of relay 10 to its right-hand or spacing contact 18, connecting positive battery through contacts 37 and 18 to apex 36.

The signals transmitted from station A to station B are therefore true polar signals. The signals transmitted from station B to station A are effectively substantially polar signals.

As the resistances of conductors 1 and 2 vary due to temperature changes, the potential of apexes 24 and 28 will tend to change and since the potentials connected to spacing terminals 32 and 34 are fixed, the drops over conductors 1 and 2 will tend to be different for marking and spacing signals transmitted from station B to station A. However, by a proper choice of resistance values of resistances 23 and 25 and 27 and 29 it is possible to achieve substantially polar signal transmission in each direction at a particular time and to maintain this condition for varying line resistance changes with a minimum of adjustment of the adjustable resistances. Further attention is called to the fact that whatever adjustment is in fact necessary may be made at a single station, station A.

Attention is called to the fact that in the event of trouble on either of conductors 1 or 2 or its associated connections, transmission in each direction may be carried on over the other conductor and the transmission characteristics will remain substantially unchanged except, of course, the advantages of reduced inductive effect, obtainable from two-conductor transmission, will not be available. This is true also of the embodiment per Fig. 2.

Attention is particularly called to the effect of inductance on the circuit of Fig. 1. Assume that as a result of a varying potential in a neighboring circuit, conductors 1 and 2 are cut by an electric field. These conductors will ordinarily be closely spaced so that the electromotive force induced in each wire will be equal and the current resulting therefrom will flow at any one instant in the same direction, say from station A to station B along both conductors. The impedance of each conductor circuit will be equal and the induced currents in each of the two conductors will be equal. The signal currents will be equal and opposite. One signal current will be increased as much as the other is decreased and their sums and additive effect in the windings of the receiving relay will be unchanged. With respect to the currents induced in other circuits, since the polarity of the potentials and the direction of flow of the currents in the two conductors are opposed at each instant for transmission of either signaling condition from either station the inductive effects of varying potentials from conductors 1 and 2 to other circuits will be neutralized.

Refer now to Fig. 2 which shows a second embodiment of the invention. In this figure the two-conductor anticross-fire feature is incorporated in a telegraph system which in its transmission characteristics is arranged similarly to what is known in the art as a type B polarential system which affords the advantage that the operation of the receiving relays at station A and station B is unaffected by variations in leakage resistance between the line conductors and ground or by variations in leakance as it is known.

As is well known in the art, in the operation of open-wire lines, the resistance between the line and ground, or leakance as it is called, is affected by weather conditions. When the weather is dry the resistance between telegraph line conductors and ground is high. When the weather is wet the resistance between the line and ground is low and tends to affect the operation of the telegraph receiving relay at each terminal due to changes in the received signal currents caused by the low resistance shunting or leakance path to ground.

In certain sections the change in moisture conditions of the air is quite variable which tends to require frequent adjustment in the receiving relays or in the magnitude of the potentials applied to the line to compensate for the changes which tend to increase maintenance expense.

The manner of coping with variable leakance conditions on single-line circuits, however, is now known. Patent 2,136,984, granted to C. W. Smith on November 15, 1938, and Patent 2,131,870, granted to W. W. Cramer October 4, 1938, with particular reference to Fig. 2 in the latter, disclose arrangements for compensating for varying leakance resistance, which eliminates or greatly minimizes the need for adjustments. The method employed essentially is the application of proper potentials to the line at each end for the marking and spacing condition. In the Cramer patent, as exemplified in Fig. 2 thereof, potentials of the same magnitude and of opposite polarities are applied to the line at one terminal, say station A, for the marking and spacing conditions while the line of the opposite terminal, say station B, is grounded. No biasing of the receiving relay at station B is required. The transmission for this condition is polar which compensates for variations either in the resistance or in the leakance since the marking and spacing signals will be equally affected by such changes. The magnitude of the marking current, that is, the current tending to operate the armature of the receiving relay to engage with its marking contact, is equal to the magnitude of the current tending to actuate the armature to engage with its spacing contact. The armature will therefore be actuated equally fast in both directions and there will be no bias or lengthening of either signal. The Cramer patent teaches that to compensate for variations in leakance for a spacing signal transmitted from station B to station A the polarity of the potential applied to the line at station B should be opposite to and its magnitude twice that of the marking potential applied to the line at station A. For a marking signal from station B ground, as previously mentioned, is connected to the line at station B. The receiving relay at station A is supplied with a biasing effect equal and opposite to the mean of the marking and spacing signal effect.

In the embodiment of Fig. 2, the transmission theory of the Cramer patent is applied to a two-conductor system, which will ordinarily be an open-wire system, subject to leakage, in a manner to afford other advantages which it is impossible to attain with a single-wire system or with a single-wire system including also a neutralizing wire.

Refer now to Fig. 2, the operation of which will first be described generally and then in detail. Fig. 2 shows station A at the left and station B at the right interconnected by a two-conductor transmission system. As in Fig. 1 transmission is possible in only one direction at a time. Extending toward the left from station A is a telegraph channel 201 to a distant terminal. Extending toward the right from station B is a loop to a subscriber station. At station A are two sending relays 202 and 203 which simultaneously receive signals incoming over channel 201 and transmit them over conductors 224 and 225 to station B, where they are received by relay 228 and impressed on the subscriber loop conductors 251 and 254 and received by the teletypewriter receiving magnet 244. Signals transmitted from the teletypewriter transmitting contacts 245 at the subscriber station operate sending relays 229 and 230 simultaneously which in turn impress them on conductors 224 and 225. They are received at station A by receiving relay 204 which in turn impresses them on channel 201 to the distant terminal. When signals are transmitted from the distant terminal through station A to station B receiving relay 204 is prevented from operating. When signals are transmitted from the subscriber station through station B to station A receiving relay 228 is prevented from operating.

The operation of the system will now be described in detail. The channel 201 to the distant terminal is terminated for marking in positive battery so that direct current flows from positive battery at the distant terminal through channel 201 and the top winding of each of relays 202 and 203 in series and the armature and marking contact 221 of relay 204 to negative battery 220. The effect of this current tends to actuate the armatures of relay 203 to the left and of relay 202 to the right to engage their respective marking contacts 212 and 209, and the effect in each of relays 203 and 202 is dominant over the countereffect of current flowing from negative battery 220 through the bottom winding of each of relays 203 and 202 in series and through resistance 205 to ground, which countereffect is tending to actuate the armature of each of relays 203 and 202 to engage its opposite or spacing contact. The armature of each of these relays is therefore maintained on its marking contact as shown in Fig. 2. For a spacing signal from the distant terminal, the channel 201 is opened. The current in the top or line winding of relays 203 and 202 ceases to flow and the armature of each of relays 202 and 203 is actuated to engage its respective spacing contact under the influence of its biasing winding the effect of which is unchanged. When the armature of relay 203 engages its marking contact a path may be traced from negative battery 210 through the marking contact 212 and armature of relay 203 and adjustable resistance 215 to junction 252 where it divides into two branches. One branch extends through adjustable resistance 216 to ground. The other extends through the top winding of relay 204, conductor 224, top winding of receiving relay 228 at station B, armature of sending relay 229, marking contact 238, and battery tap resistance 235 to ground 237. Simultaneously current flows from positive battery 207 through the marking contact 209 and armature of relay 202 and adjustable resistance 218 to the junction 253 of two branches. One branch extends through adjustable resistance 219 to ground 217. The other extends through the middle winding of receiving relay 204, conductor 225, bottom winding of receiving relay 228 at station B, armature and marking contact 248 of sending relay 230 and battery top resistance 236 to ground. The effect of the current in the top winding of relay 228 and the effect of the current in its bottom winding are additive and in a direction to actuate the armature of relay 228 to engage its right-hand or marking contact 223 as shown.

When the armatures of relays 202 and 203 are actuated simultaneously to engage their respective spacing contacts, the polarities of the potentials applied through the top and bottom windings of relay 228 are reversed. They will still be additive but in a direction to actuate the armature of relay 228 to its spacing contact. Each of the potentials 206, 207, 210 and 211 is of the same magnitude. The reversal of polarity each time a marking and spacing signal is transmitted effects the transmission of polar signals over each of conductors 224 and 225 which will be equally affected by variations in line resistance and in leakance resistance to ground so that the armature of receiving relay 228 will be actuated at any given time at equal speed in each direction and no bias will be introduced as a result of these resistance changes.

At station B, for the marking condition, a circuit may be traced from positive battery 234 through marking contact 233 and armature of relay 228 to junction 255 of parallel branches. One branch extends through the bottom winding of relay 229, resistance 242 and the top winding of relay 230 to ground 237, and the effect of the current flowing in each of these windings tends to actuate its respective armature to the right to engage its spacing contact. The other branch extends from junction 255 through the top winding of relay 229, resistance 243, loop conductor 251, to the subscriber station, through magnet 244 of the telegraph receiving device and contacts 245 of the telegraph transmitter thereat, then through loop conductor 254 back to station B where it passes through the bottom winding of relay 230 and resistance 247 to negative battery 246. The effect of the current in this path flowing through the top winding of relay 229 and the bottom winding of relay 230 tends to actuate the armature of each of relays 229 and 230 to engage with its left-hand or marking contacts 238 and 248, respectively as shown, and it is dominant over the countereffect in the biasing windings so that the armature of each of relays 229 and 230 engages its marking contact. Current in the loop also energizes the receiving magnet 244. When the armature of relay 228 is actuated to engage its left-hand or spacing contact 232, negative battery 231 is connected to one end of the loop and negative battery 246 is connected to the other. No current flows in the loop. Magnet 244 is deenergized for the spacing condition. Simultaneously the current in the biasing windings of relays 229 and 230 is reversed and its effect maintains the armature of each of these relays in engagement with its marking contact as shown.

In transmitting a spacing signal from the subscriber station, transmitting contacts 245 are actuated to open the loop. No current flows in the loop windings of relays 229 and 230. The armature of each of these relays is actuated to engage its respective spacing contact 239 and 249 under the influence of its biasing winding.

To return momentarily to station A, adjustable resistances 215 and 216 are adjusted so that the potential of junction 252 for the marking condition of relay 203 is equal in magnitude to one half the magnitude of effective spacing potential of potential source 241 applied to the line 224 at station B. The polarities as shown are opposite. Similarly, adjustable resistances 218 and 219 are adjusted so that the magnitude of the potential of junction 253 for the marking condition of relay 202 is equal to one half the magnitude of the effective spacing potential of potential source 246 applied to the line 225 at station B. The polarities are again opposite as shown. In the case of conductor 224, for the marking condition, assuming a direction of current flow from ground to negative, current flows from right to left through the top winding of relay 204. In the case of conductor 225 the direction is opposite, from positive battery 207 at station A to ground 237 at station B, or from left to right through the bottom winding of relay 204. The top and bottom windings of relay 204 are arranged so that their effects are additive. For a spacing signal transmitted from station B to station A over conductor 224 positive potential 241 is connected to conductor 224 while a reverse polarity of potential of one half the magnitude is applied to junction 252. Current flows again from right to left through conductor 224. In the case of conductor 225 the magnitude of the negative potential 246 applied to the line 225 at station B is twice that of the magnitude of the positive potential applied at junction 253 at station A. Again current flows through conductor 225 from left to right. In other words, the direction of current flow through both conductors 224 and 225 is the same for a spacing signal transmitted from station B to station A as for a marking signal transmitted from station A to station B.

Therefore, with respect to the receiving relay 228 at station B, since its armature is held to marking for a marking signal transmitted from station A it will also be held to marking for a spacing signal transmitted from station B and will be actuated to spacing only for a spacing signal received from station A. The armature of the receiving relay 204 at station A tends to be actuated by the additive effect of the current in each of its line windings to engage its spacing contact 222 while a marking signal is being transmitted in either direction. Relay 204 is equipped with a biasing circuit which extends from battery 250 through adjustable resistance 227 and the bottom winding of relay 204 to ground. The effect of the current flowing in the biasing winding is in a direction to actuate the armature of relay 204 to engage with its marking contact and the biasing effect is dominant for the marking condition so that the armature of relay 204 engages its marking contact 221 for the marking condition. For the spacing condition transmitted from station A, since the polarities of the potentials applied to both conductors 224 and 225 are reversed, the effects of the current in the top and middle windings of relay 204 will be reversed. They will still be additive but they will be in a direction to aid the effect of the biasing winding in maintaining the armature of relay 204 on its marking contact. In the case of a spacing signal transmitted from station B, the direction of the flow of current is the same as for a marking signal transmitted from station A to station B, the effect of which tends to actuate the armature of relay 204 toward its spacing contact. When a spacing signal is transmitted from station B to station A, however, due to the increase in potential the effect in the line windings of relay 204 is great enough to overcome the counter effect of the biasing winding. If the biasing effect in relay 204 is established at one half of the sum of the marking effect and of the effect of a spacing signal transmitted from station B to station A, and opposite thereto, the armature of relay 204 will be actuated in each direction with equal speed in response to signals transmitted from station B. If the magnitude and polarities of the potentials applied to the conductors 224 and 225 are as described, the operation of relay 204 will be unaffected by variations of leakance.

The effect of induction in conductors 224 and 225 in the arrangement per Fig. 2 will be the same as described for the circuit per Fig 1.

There are other advantages realizable from the circuits of the present invention as follows:

Since both line wires are used for operating and the effects of the signal currents in each are additive, currents of smaller magnitude may be employed in each conductor or longer circuits can be operated.

The arrangement per Fig. 1 is operative in both directions alternately, of course, over either conductor if the other should fail.

The arrangement per Fig. 2 is similarly operative toward station B over one conductor if the other should fall. In the opposite direction if one wire should fail the circuit is operative provided the current in the other wire is not reduced below the value of the biasing current which may be adjusted as required.

The foregoing will greatly reduce service failure.

What is claimed is:

1. A direct-current telegraph system having a first and a second telegraph signal current conductor, a first and a second end on said conductors at a first and a second station responsively, a first and a second source of equal and opposite potential at said first station, a first and a second telegraph transmitting contact connected to said ends of said first and said second conductors respectively at said first station, means at said first station for actuating said contacts at said first station to engage said sources of potential simultaneously in such manner as to apply a potential of opposite polarity to each of said conductors for one signaling condition and reverse polarities for a second condition, each of said second ends grounded at said second station, a telegraph receiving device having an individual winding connected in series in each of said lines at said second station, said connections so made that their effects are aiding.

2. In a telegraph system, a two-conductor direct-current telegraph system, said conductors grounded at a first station, sources of equal and opposite potentials connectable simultaneously to said conductors at a second station, means at said second station for simultaneously reversing said sources connected to said conductors so as to transmit polar signals of opposite polarities over each of said conductors simultaneously, a polar relay receiving device having a first and a second winding connected individually in series with said conductors at said first station, said windings arranged so that their effects are cumulative so as to receive equal and opposite amounts of energy for marking and spacing signals transmitted from said second station.

3. A system in accordance with claim 2, sources of potential of opposite polarity at said first station, the magnitude of each of said sources twice that of the magnitude of the potential effectively applied to said conductors at said second station for the marking condition, means at said first station for simultaneously grounding both of said conductors for the marking condition and for simultaneously impressing said sources of potential of twice the magnitude connected to its respective opposite end so that the polarities of the potentials at the opposite ends of each individual conductor are the same for the spacing condition, a receiving relay at said second station having an individual winding connected in series with each of said conductors, said windings arranged so that the effect of the current therein at any given time is cumulative.

4. A direct-current, half duplex, polarential telegraph system having two line conductors, each of said conductors having a winding connected in series on an individual receiving relay at each of two terminals, said windings connected so that their effects are cumulative, said conductors both terminated at one of said terminals in ground for the marking conditions, sources of potential of equal magnitudes and opposite polarities connectable alternately to said conductors at the other of said terminals for the marking and spacing conditions respectively, said conductors closely spaced, one from the other, to minimize the effect of inductive interference.

5. In a direct-current telegraph system, a first and a second telegraph station, a first and a second telegraph line connecting said stations, each of said lines grounded at said second station, means at said first station for applying a potential of plus $a$ volts to said first line and of minus $a$ volts to said second line simultaneously for a first signaling condition, means at said first station for applying a potential of minus $a$ volts to said first line and of plus $a$ volts to said second line simultaneously for a second signaling condition, while said lines remain grounded at said second station for both of said signaling conditions, means at said second station for applying a potential of plus $2a$ volts to said first line and of minus $2a$ volts to said second line simultaneously for a third signaling condition while said potential of plus $a$ volts is applied to said first line and said potential of minus $a$ volts is applied to said second line at said first station and a receiving device at each of said stations, each of said devices having two windings, one of said windings on each of said devices connected in series with said first line and the other of said windings on each of said devices connected in series with said second line, said two windings of each of said devices interconnected so that their effects in each of said relays are cumulative.

6. A system in accordance with claim 5 including a variable resistance network connected in each of said lines at said first station for adjusting the potential applied to said lines.

7. In a direct-current telegraph system, a pair of lines interconnecting a pair of stations, said pair of lines grounded at one of said stations, means at the other of said stations for applying polar telegraph signals to each of said lines of said pair simultaneously, with the polarity applied to one of said lines the reverse of the polarity applied to the other of said lines at all times, means at said one of said stations for applying to each of said lines individually a potential of twice the magnitude and of the same polarity as is applied to it individually at said other of said stations, a polar receiving relay at each of said stations, each of said relays having two windings, one of said windings of each of said relays connected in series with one of said lines and the other of said windings of each of said relays connected in series with the other of said lines, said windings on each of said relays connected so that their effects on each relay are cumulative.

8. A system in accordance with claim 7 including manually operable variable resistances connected in series and in shunt with said lines at the other of said stations for adjusting the potential applied to said lines.

9. A system in accordance with claim 7 including an auxiliary relay at said other station for preventing the retransmission of signals passing through said other station toward said one station back toward their source.

10. A system in accordance with claim 7 in which an individual polar relay applies said polar signals to each of said lines at said other station and in which said polar receiving relay at said other station follows the signals transmitted toward said one station, said system including an auxiliary relay to prevent the retransmission of said signals so followed toward their source.

11. In a direct-current telegraph system, a pair of telegraph lines grounded at a first station and extending to a second station, relay means at said second station for applying polar signals to each of said lines simultaneously, the polarities of the potentials applied to each of said lines at any one time being opposed to the polarity applied to the other, relay means at said first station for grounding each of said lines simultaneously as a first signaling condition and for simultaneously applying to each of said lines individually a potential of twice the magnitude of and of opposite polarity to the potential applied to said line at said second station as a second signaling condition, a receiving relay at each of said stations, said relays each having two windings, one winding of each of said two windings connected individually in series in each of said lines, said windings connected so that their effects are cumulative in each of said relays and a biasing winding on said receiving relay at said second station, the magnitude of the effect of said biasing winding being equal to the average of the effects of the signals received from said first station and opposed thereto.

12. In a direct-current telegraph system a first telegraph line grounded at a first station, said line extending through a contact and armature of a first sending relay through a first winding of a first receiving relay at said first station to a second station, through a second winding on a second receiving relay, through an armature and contact of a second sending relay, through a first source of negative potential of magnitude $a$ to ground, a second telegraph line grounded at said first station, said line extending through a contact and armature of a third sending relay, through a third winding on said first receiving relay to said second station, through a fourth winding on said second receiving relay, through an armature and contact on a fourth sending relay to a second source of positive potential of magnitude $a$, said windings on each of said receiving relays connected so that their effects on their respective relays are cumulative, means for actuating said armatures of said second and fourth sending relays so as to impress said second source of positive potential $a$ on said first line and said first source of negative potential $a$ on said second line, simultaneously, at said second station, while said ground remains connected to said lines at said first station, a third source of positive potential of magnitude $2a$ and a fourth source of negative potential of magnitude $2a$ at said first station and means for actuating said armatures of said first and third sending relays so as to connect said third and fourth sources of said first and said second lines, respectively, simultaneously, while said first and said second sources of potential are connected to said first and said second lines respectively at said second station, a biasing winding on said second receiving relay, the effect of said winding being equal and opposite to one half of the sum of the combined effects of said second and fourth winding for the grounded condition and the $2a$ potential conditions of said lines at said first station.

13. In a direct-current telegraph system, two telegraph lines interconnecting two telegraph stations, a double commutator for connecting each of said lines simultaneously to sources of equal and opposite potentials and then reversing the connections to said sources, simultaneously, at one of said stations, both of said lines grounded meanwhile at the other of said stations, another double commutator at said other of said stations, for connecting both of said lines alternately to ground, simultaneously for one signaling condition, and to sources of potential of twice the magnitude of said sources at said one station, simultaneously, for a second signaling condition, the source of potential at each end of each line being in series aiding relationship for its respective line for said second condition, an unbiased relay controlled cooperatively by said lines at said other station, and a biased relay controlled cooperatively by said lines at said one station.

FRANK H. FAY.

REFERENCES CITED

The following references are of record in the file of this patent:

UNITED STATES PATENTS

| Number | Name | Date |
|---|---|---|
| 1,402,240 | Masters | Jan. 3, 1922 |
| 1,762,952 | Bell | Feb. 28, 1928 |
| 1,865,571 | Kline | July 5, 1932 |